(12) United States Patent
Bower

(10) Patent No.: US 6,325,358 B1
(45) Date of Patent: Dec. 4, 2001

(54) GATE VALVE

(76) Inventor: John C. Bower, P.O. Box 41319, Greensboro, NC (US) 27404-1319

( * ) Notice: Subject to any disclaimer, the term of this patent is extended or adjusted under 35 U.S.C. 154(b) by 0 days.

(21) Appl. No.: 09/511,301

(22) Filed: Feb. 23, 2000

(51) Int. Cl.$^7$ ................................ F16K 3/00; F16K 1/00; F17D 3/00
(52) U.S. Cl. .................... 251/329; 251/326; 251/333; 137/15.01
(58) Field of Search .................................. 251/319, 326, 251/329, 333; 137/15.01

(56) References Cited

U.S. PATENT DOCUMENTS

| | | | |
|---|---|---|---|
| 1,801,237 | * | 4/1931 | Hanson . |
| 3,316,929 | * | 5/1967 | Milette . |
| 3,333,814 | * | 8/1967 | Sargent ................................ 251/329 |
| 3,941,349 | * | 3/1976 | Pierson ................................ 251/100 |
| 4,646,777 | * | 3/1987 | Stalder et al. ....................... 251/329 |
| 4,830,233 | * | 5/1989 | Thelen et al. ....................... 222/450 |
| 4,875,504 | * | 10/1989 | Nicholson ........................... 137/899 |
| 5,078,180 | * | 1/1992 | Collins ................................. 137/899 |
| 5,445,190 | * | 8/1995 | Gunder ................................ 137/899 |
| 6,050,288 | * | 4/2000 | Junier ................................. 137/315 |

\* cited by examiner

Primary Examiner—Kevin Shaver
Assistant Examiner—D. Austin Bonderer

(57) ABSTRACT

A gate valve is provided for granular or other dry materials which reduces the tendency of the valve to clog or jam during closing. The valve includes a slide having an arcuate-shaped forward end and a flared passageway to insure proper closing. The preferred form of the invention is made of durable plastic although other materials may also be employed.

12 Claims, 4 Drawing Sheets

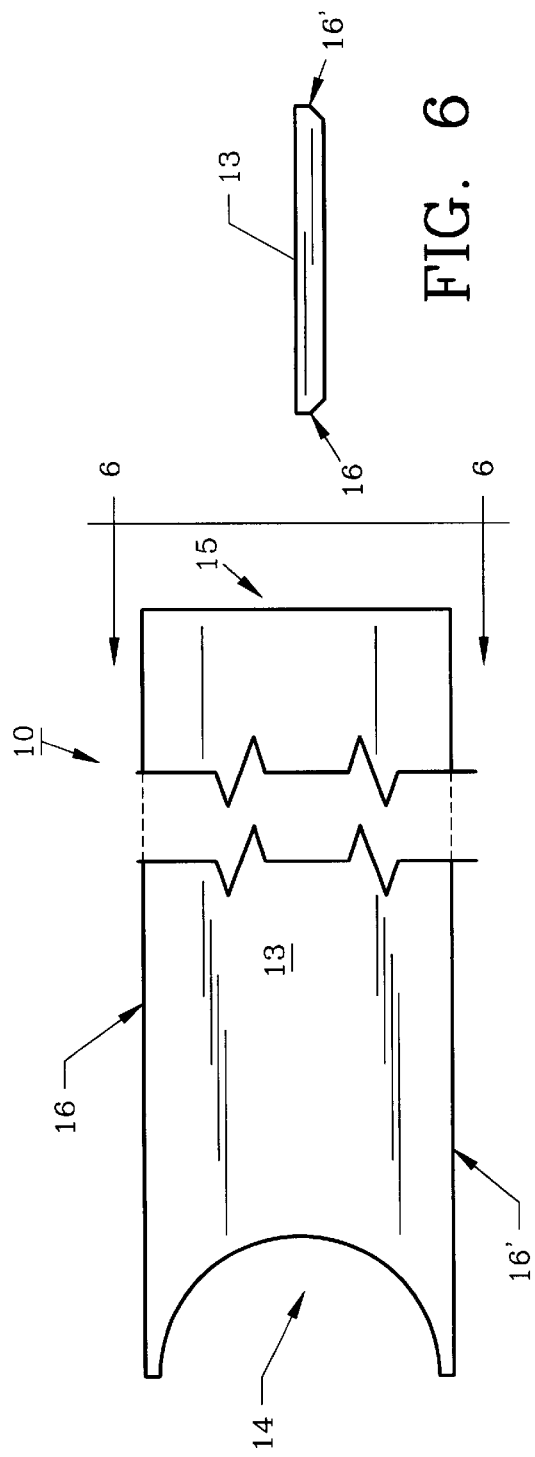
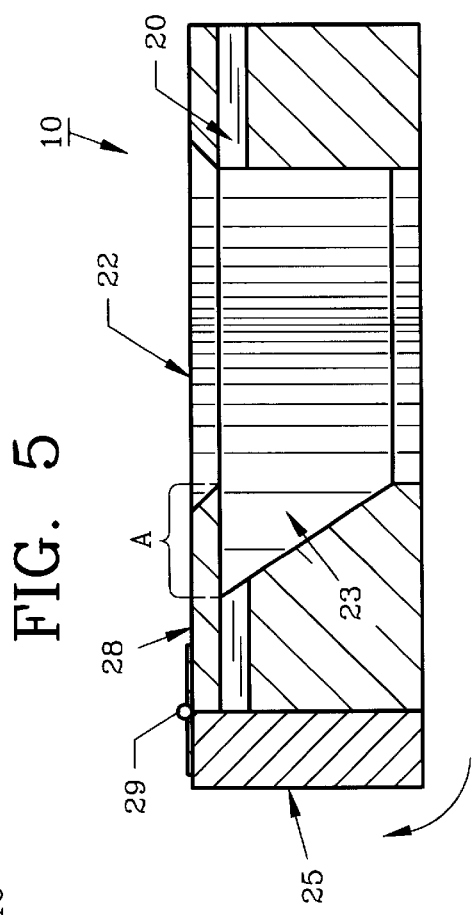

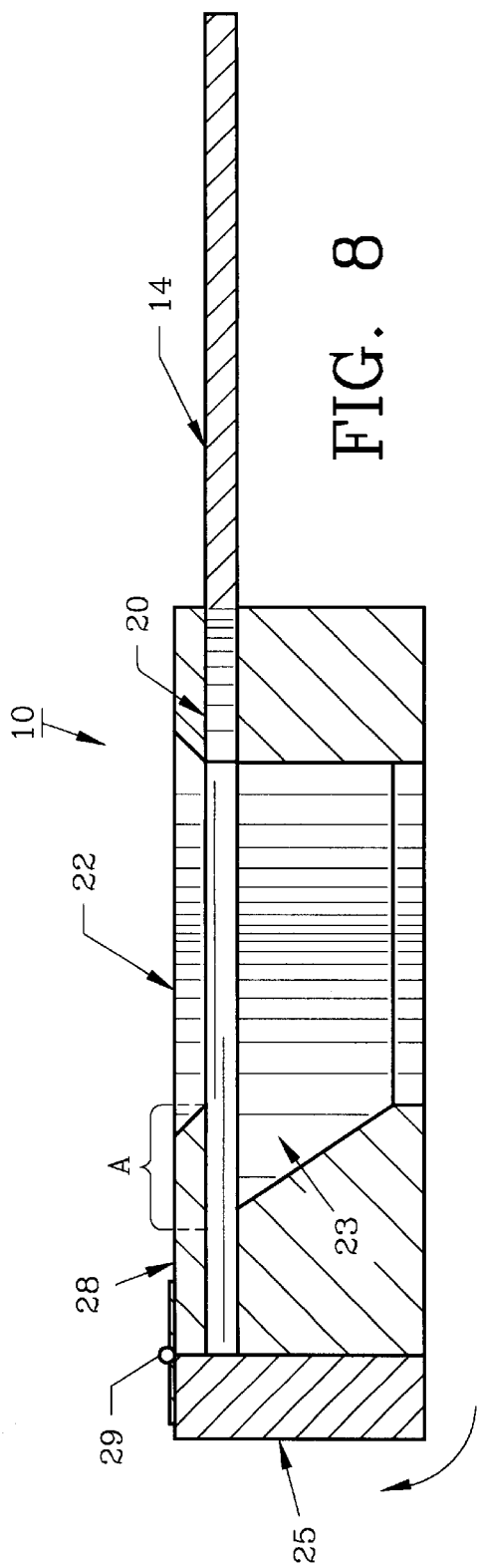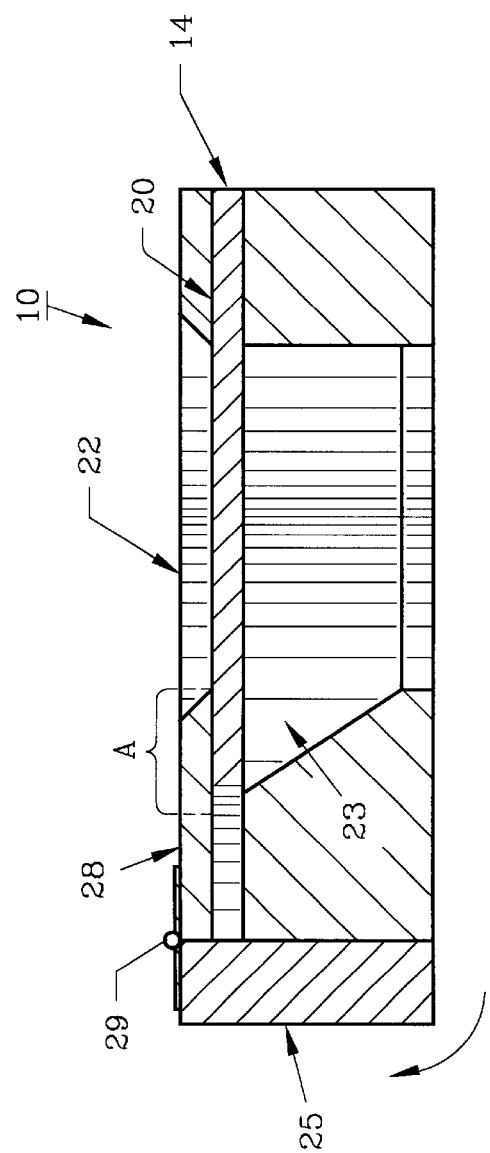

GATE VALVE

FIELD OF THE INVENTION

The invention herein pertains to valves and particularly to gate valves that are used to control the flow of powders, granules and other dry materials. The valve includes a movable slide which has an arcuate front end which, in conjunction with the flared forward end of the passageway, prevents clogging of the valve and jamming of the slide during use.

DESCRIPTION OF THE PRIOR ART AND OBJECTIVES OF THE INVENTION

The control of dry or granular materials through valves has long been troublesome in that during valve closing, the dry material tends to cling to the slide and/or passageway, to prevent the valve from completely closing. The incomplete closing of the valve will allow the valve to leak. Clogging or sticking valves can cause serious maintenance concerns in addition to unwanted powder or granule distribution due to the valves remaining partially open. This concern is of particular importance in the agricultural industry where fertilizers, defoliants and insecticides must be precisely distributed without unwanted spillages due to the low profit margins, and environmental hazards which can be caused.

It is therefore an objective of the present invention to provide a gate valve which includes a slide having an arcuate concave end to encourage full closure.

It is another objective of the present invention to provide a gate valve having first and second passageway segments with the slide positioned therebetween.

It is still a further objective of the present invention to provide a gate valve in which the second passageway segment is flared to increase granular flow therethrough.

Various other objectives and advantages of the present invention will become apparent to those skilled in the art as a more detailed description is set forth below.

SUMMARY OF THE INVENTION

The invention herein pertains to a gate valve and particularly to a gate valve to prevent the tendency of the valve to stick or clog when used with dry materials such as granules or powder. The valve includes a passageway which is divided into segments by a movable planar slide. The forward end of the second or lower passageway is flared and the slide has an arcuate concave configuration to facilitate closing and lessen the possibility of granular material becoming lodged between the slide seat, slide and passageway walls. An access door is hingeably attached to the forward end of the valve seat for cleaning purposes.

BRIEF DESCRIPTION OF THE DRAWINGS

FIG. 2 shows a side cross-sectional view of the gate valve housing as shown in FIG. 1 with the slide removed;

FIG. 5 features a fragmented top view of the slide as incorporated into the gate valve; and FIG. 6 pictures an end view of the slide along lines 6—6 as seen in FIG. 5.

FIG. 7 shows a cross-sectional view of the gate valve as seen in FIG. 2 with the slide fully inserted and the valve closed; and FIG. 8 depicts a cross-sectional view of the gate valve as seen in FIG. 2 with the slide partially withdrawn and the valve fully open.

DESCRIPTION OF THE PREFERRED EMBODIMENT AND OPERATION OF THE INVENTION

Figure 1:
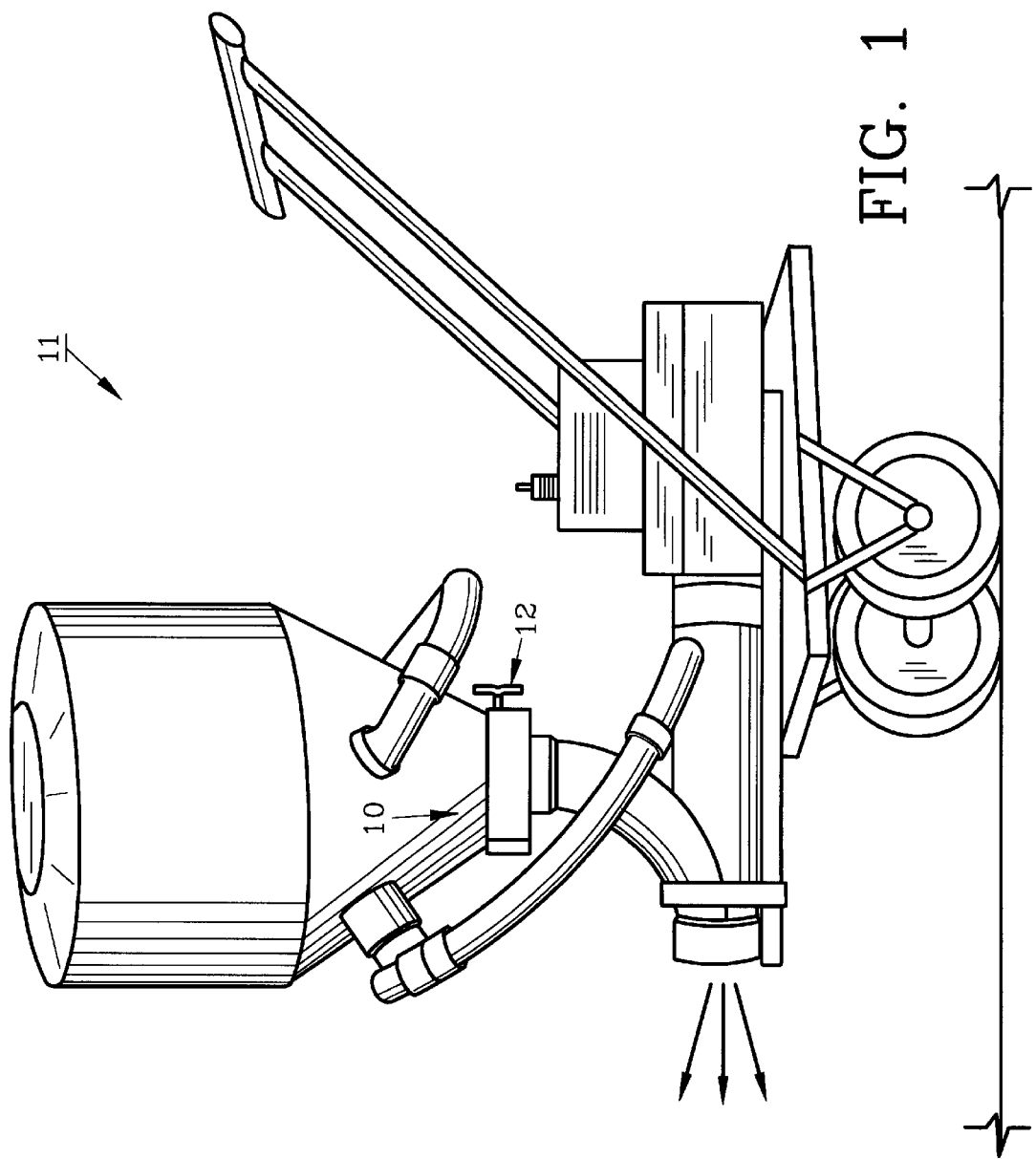
FIG. 1 demonstrates a typical agricultural fertilizer spreader utilizing the preferred form of the gate valve of the invention.
Figure 4:
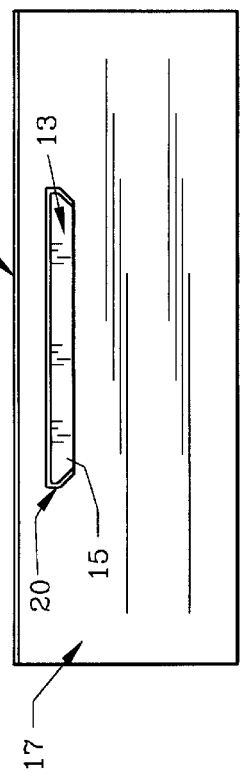
FIG. 4 illustrates a rear end view of the gate valve as shown in FIG. 1 with the handle removed from the slide.

Turning now to the drawings, for a detailed description of the preferred form of the invention as shown in FIG. 1, gate valve 10 is seen attached to agricultural fertilizer distributor 11. Gate valve 10 is manually controlled by handle 12 (FIG. 1) which is attached to slide 13 as seen in FIG. 5 (removed from valve 10). Slide 13 in its preferred form, has an arcuate-shaped forward end 14 which is concave and semi-circular in shape. The radius of the semi-circle defined is substantially equal to the width of the upper passageway segment 22 to facilitate the flow of material from upper passageway segment 22 into lower passageway segment 23 when slide 13 is in the open position. Rear end 15 of slide 13 is attached to handle 12 (not shown in FIG. 5) and the sides 16, 16' of slide 13 are tapered as seen in FIG. 6 with top and bottom surfaces of slide 13 being flat and planar. The taper of sides 16 and 16' are perhaps better illustrated in FIG. 4 which depicts rear end 15 of slide 13 in slide seat 20. As shown, the sides of seat 20 are tapered at an approximately 45° angle along sides 16, 16' as seen in FIG. 6. Handle 12 (seen in FIG. 1) can be formed integrally with slide 13 or can be attached by various conventional means such as screws. Slide 13 may be operated, other than manually such as by hydraulic, pneumatic or electrical power.

Figure 3:
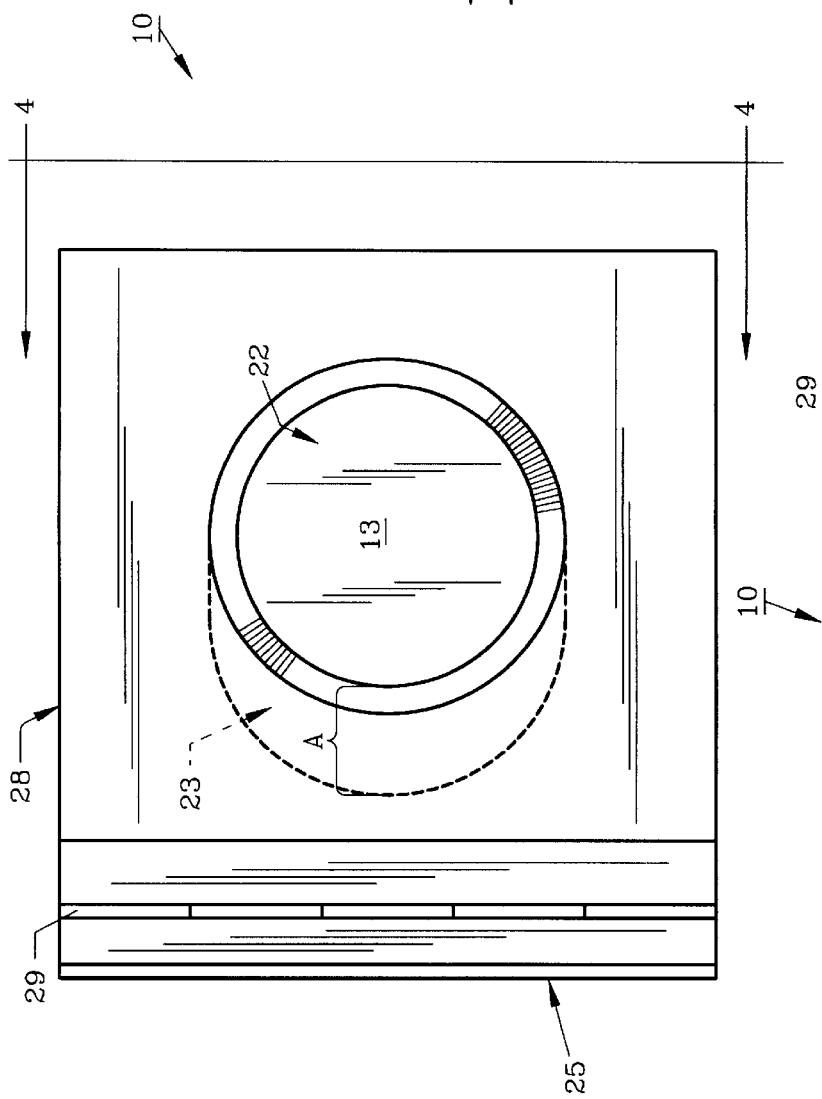
FIG. 3 depicts a top plan view of the housing of the gate valve as seen in FIG. 1 without the handle attached to the slide.

As shown in FIG. 2, gate valve 10 includes an upper or first passageway segment 22 and a lower or second passageway segment 23, which are separated by slide seat 20. Upper passageway segment 22 is conically shaped, whereas lower passageway segment 23 preferably includes only a flared section A at the forward end thereof. In FIG. 3, the forward, flared end section A of passageway segment 23 is also shown which has a top opening below seat 20 larger than passageway 22. This flared portion and the larger sized top opening of passageway segment 23 allows any powder or granular materials which are pushed forward as slide 13 closes to fall downwardly and pass through passageway segment 23 without clogging or jamming slide 13 in slide seat 20.

In FIG. 7 gate valve 10 is seen in a fully closed position whereas, in FIG. 8 gate valve 10 is seen fully open with slide 14 partially withdrawn therefrom.

In the event cleaning is required as needed between uses of gate valve 10, for example between using fertilizer and an insecticide, door 25 which is attached to housing 28 by hinge 29 can be manually raised and water or air used to clean slide seat 20 of gate valve 10.

As would be understood, gate valve 10 can be made from a variety of materials although it has been found to be preferred to form gate valve 10 from a hard, durable plastic such as nylon.

The illustrations and examples provided herein are for explanatory purposes and are not intended to limit the scope of the appended claims.

I claim:

1. A gate valve comprising: a housing, said housing defining a material passageway and a slide seat, a slide, said slide for opening and closing said passageway, said slide movably positioned within said slide seat, said slide defining a horizontally arcuate-shaped forward end, said material passageway having an upper and a lower segment, said slide positionable between said lower and said upper passageway segments, said upper passageway segment having a conically-shaped cross section, said lower passageway segment comprising a flared forward section.

2. The gate valve of claim 1 wherein said slide is planar.

3. The gate valve of claim 1 wherein said material passageway is perpendicular to said slide seat.

4. The gate valve of claim 1 wherein said housing is formed from a plastic.

5. The gate valve of claim 1 wherein said arcuate-shaped slide end defines a radius equal to the radius of said upper material passageway.

6. The gate valve of claim 1 further comprising: a door, said door pivotally mounted on said housing, said door for allowing access to said slide seat.

7. A gate valve comprising: a housing, said housing defining a material passageway and a slide seat, a slide, said slide defining a horizontally arcuate-shaped forward end, said slide movably positioned within said slide seat for opening and closing said material passageway, said material passageway having an upper and a lower segment, said slide positionable between said lower and said upper passageway segments within said slide seat, said upper passageway segment defining an opening at the bottom thereof, said lower passageway segment defining an opening at the top thereof, said lower passageway segment top opening larger than said upper passageway segment bottom opening, whereby said material passageway is closed by extending said slide so as to completely cover the upper passageway segment bottom opening while partially covering the lower passageway segment top opening.

8. The gate valve of claim 7 wherein said slide is planar.

9. The gate valve of claim 7 wherein said material passageway is perpendicular to said slide channel.

10. The gate valve of claim 7 wherein said lower passageway segment defines a conical shape with a flared forward section.

11. The gate valve of claim 7 wherein said horizontally arcuate-shaped slide end defines a radius equal to the radius of said upper passageway segment.

12. A gate valve comprising: a housing, said housing defining a material passageway and a slide seat, a slide, said slide movably positioned within said slide seat for opening and closing said passageway, said slide defining a concave horizontal forward end, said material passageway having an upper and a lower segment, said slide positionable between said lower and said upper passageway segments, said lower passageway segment comprising a flared forward section extending beneath said upper passageway segment whereby, upon closing said passageway said concave horizontal forward end is positioned above said flared forward section of said lower passageway segment.

* * * * *